(12) United States Patent
Deloubes

(10) Patent No.: US 9,586,671 B2
(45) Date of Patent: Mar. 7, 2017

(54) UNITARY PANEL FOR THE FLOOR OF A VEHICLE, FLOOR, AND VEHICLE INCLUDING SUCH A UNITARY PANEL

(71) Applicant: SOGECLAIR S.A., Saint Jean (FR)

(72) Inventor: Mathieu Deloubes, Bretx (FR)

(73) Assignee: SOGECLAIR S.A., Saint Jean (FR)

(*) Notice: Subject to any disclaimer, the term of this patent is extended or adjusted under 35 U.S.C. 154(b) by 0 days.

(21) Appl. No.: 14/389,186

(22) PCT Filed: Mar. 28, 2013

(86) PCT No.: PCT/EP2013/000941
§ 371 (c)(1),
(2) Date: Sep. 29, 2014

(87) PCT Pub. No.: WO2013/143701
PCT Pub. Date: Oct. 3, 2013

(65) Prior Publication Data
US 2015/0048206 A1 Feb. 19, 2015

(30) Foreign Application Priority Data
Mar. 30, 2012 (FR) ...................... 12 00968

(51) Int. Cl.
*B64D 11/06* (2006.01)
*B64C 1/20* (2006.01)
(Continued)

(52) U.S. Cl.
CPC ................ *B64C 1/18* (2013.01); *B64C 1/061* (2013.01); *B64C 1/20* (2013.01); *B64D 11/04* (2013.01);
(Continued)

(58) Field of Classification Search
CPC ......... B64D 11/0696; B64C 1/20; B64C 1/18; B60N 2/01558; B60N 2/015; B65G 39/12; B63B 29/06
(Continued)

(56) References Cited

U.S. PATENT DOCUMENTS 3,946,529 A * 3/1976 Chevaux ...................... 150/105
4,185,799 A * 1/1980 Richards, Jr. ...... B64D 11/0023
244/118.5
(Continued)

FOREIGN PATENT DOCUMENTS

EP 0644096 3/1995
EP 1473224 A1 * 11/2004
(Continued)

*Primary Examiner* — Phi A
*Assistant Examiner* — Omar Hijaz
(74) *Attorney, Agent, or Firm* — DeFillo & Associates; Evelyn A DeFillo

(57) ABSTRACT

The invention relates to a unitary floor panel (1) for a means of transportation, comprising a self-supporting plate (2) having a smallest dimension, called the thickness, extending along a first direction of the self-supporting plate (2), and two larger dimensions extending along two directions that are orthogonal to each other and orthogonal to the thickness; the self-supporting plate (2) having two opposite sides, called main sides, that extend substantially parallel to the two orthogonal directions; characterized in that the panel comprises at least one beam (5) securely fastened to the self-supporting plate (2) and having an axis of elongation parallel to at least one first main side of the self-supporting plate (2), each beam (5) being designed to increase the flexural strength of the unitary panel (1) along the axis of elongation of the beam (5).

4 Claims, 6 Drawing Sheets

(51) Int. Cl.
  *B64C 1/18*   (2006.01)
  *B60N 2/015*  (2006.01)
  *B65G 39/12*  (2006.01)
  *B63B 29/06*  (2006.01)
  *B64C 1/06*   (2006.01)
  *B64D 11/04*  (2006.01)

(52) U.S. Cl.
  CPC .......... *B64D 11/06* (2013.01); *B64D 11/0696* (2013.01); *Y02T 50/46* (2013.01); *Y10T 29/49622* (2015.01)

(58) Field of Classification Search
  USPC ........ 52/33, 143, 174, 384–386, 390, 403.1, 52/480, 801.11, 506.05
  See application file for complete search history.

(56) References Cited

U.S. PATENT DOCUMENTS

| | | | | |
|---|---|---|---|---|
| 5,178,346 | A * | 1/1993 | Beroth | 244/122 R |
| 5,555,699 | A * | 9/1996 | Borthick et al. | 52/801.11 |
| 6,086,018 | A * | 7/2000 | Gobeil et al. | 244/122 R |
| 6,260,813 | B1 * | 7/2001 | Whitcomb | 248/503.1 |
| 2005/0072897 | A1* | 4/2005 | Fanucci | B63B 29/06 248/647 |
| 2005/0173608 | A1* | 8/2005 | Lory | 248/418 |
| 2005/0180836 | A1* | 8/2005 | Dowty | B64D 11/0696 410/105 |
| 2005/0224648 | A1 | 10/2005 | Grether | |
| 2006/0038071 | A1* | 2/2006 | Schoene | 244/118.6 |
| 2008/0098682 | A1 | 5/2008 | Wood | |
| 2008/0156233 | A1* | 7/2008 | Paddock et al. | 108/44 |
| 2010/0108808 | A1* | 5/2010 | Allain | B64D 11/0696 244/118.6 |
| 2015/0115101 | A1* | 4/2015 | Thomaschewski | 244/118.6 |

FOREIGN PATENT DOCUMENTS

| | | | |
|---|---|---|---|
| FR | 2891237 | 3/2007 | |
| FR | 2891239 | 3/2007 | |
| FR | 2939404 | 6/2010 | |
| WO | WO2006102090 | 9/2006 | |
| WO | WO 2009072342 A1 * | 6/2009 | ............ B60N 2/015 |

* cited by examiner

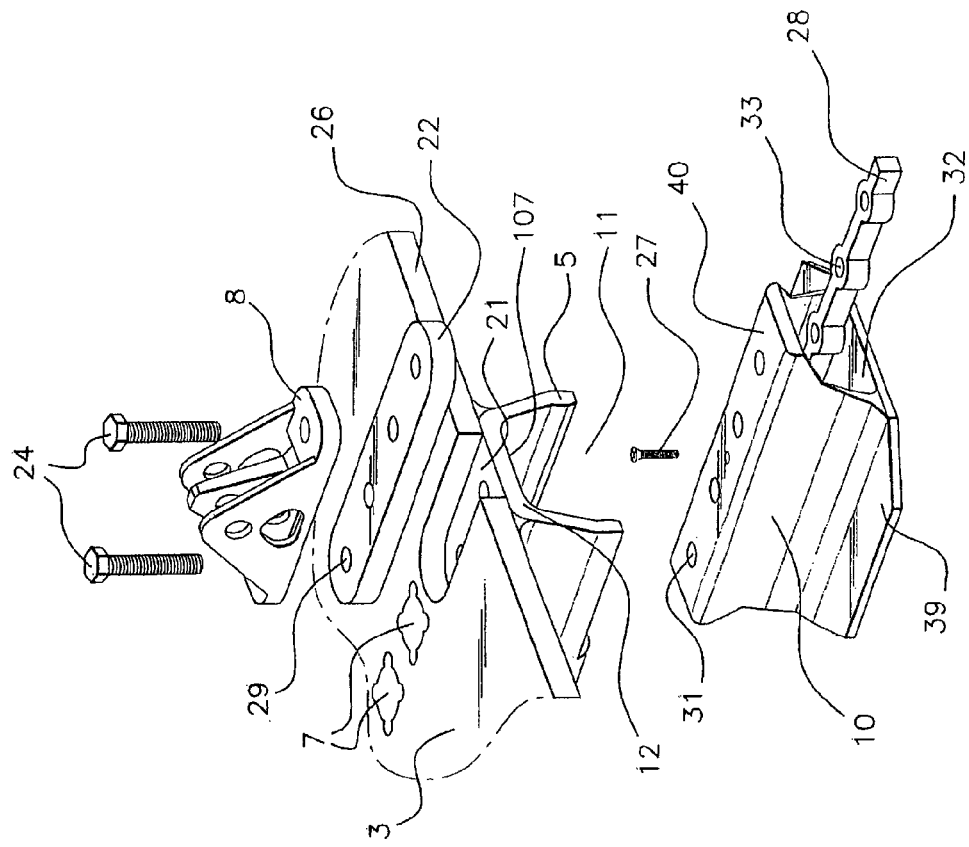
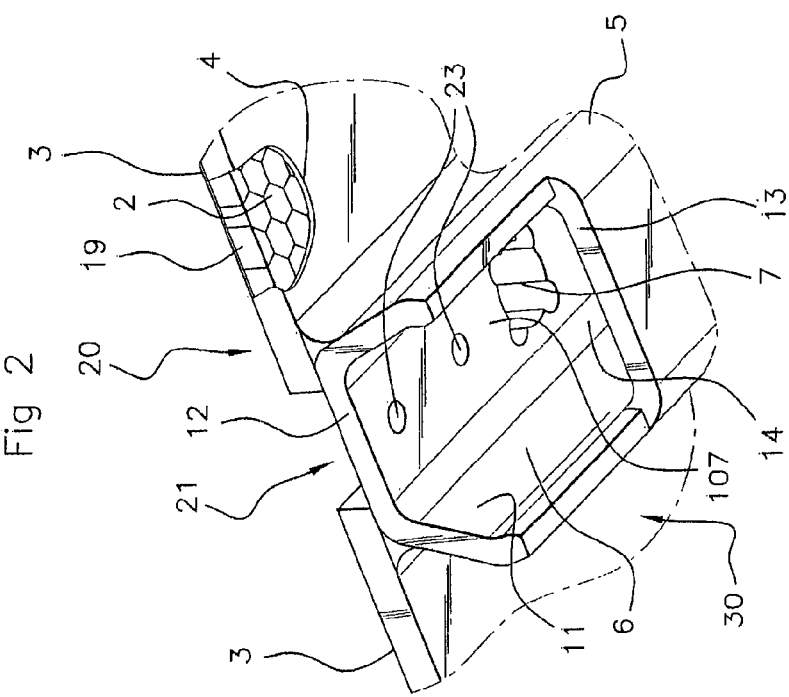

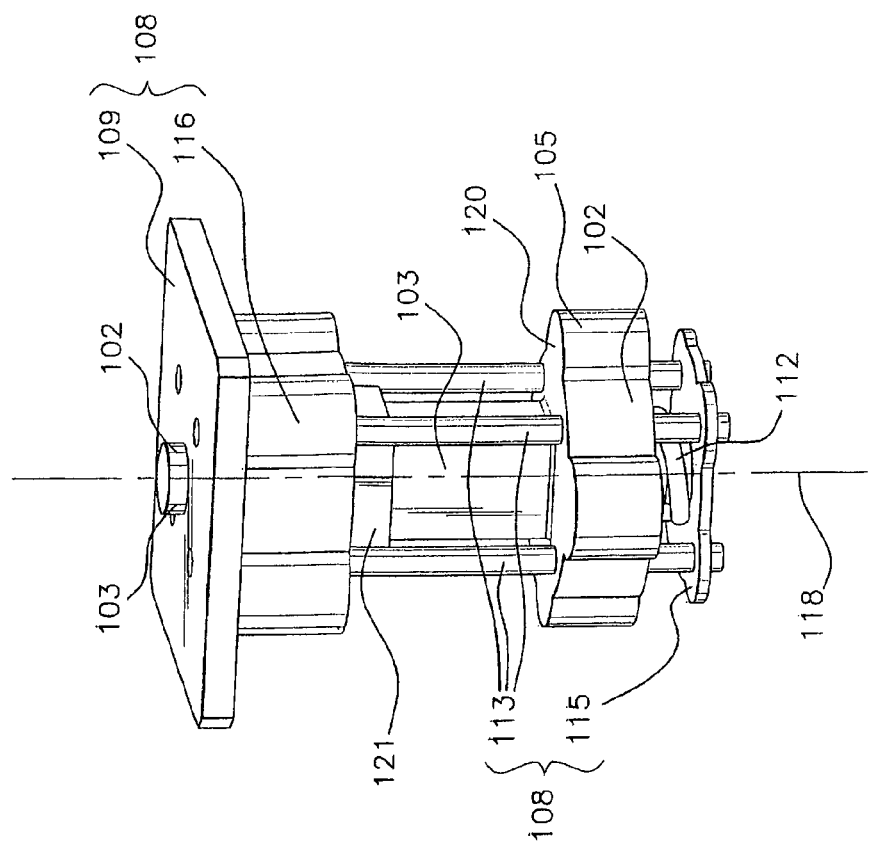
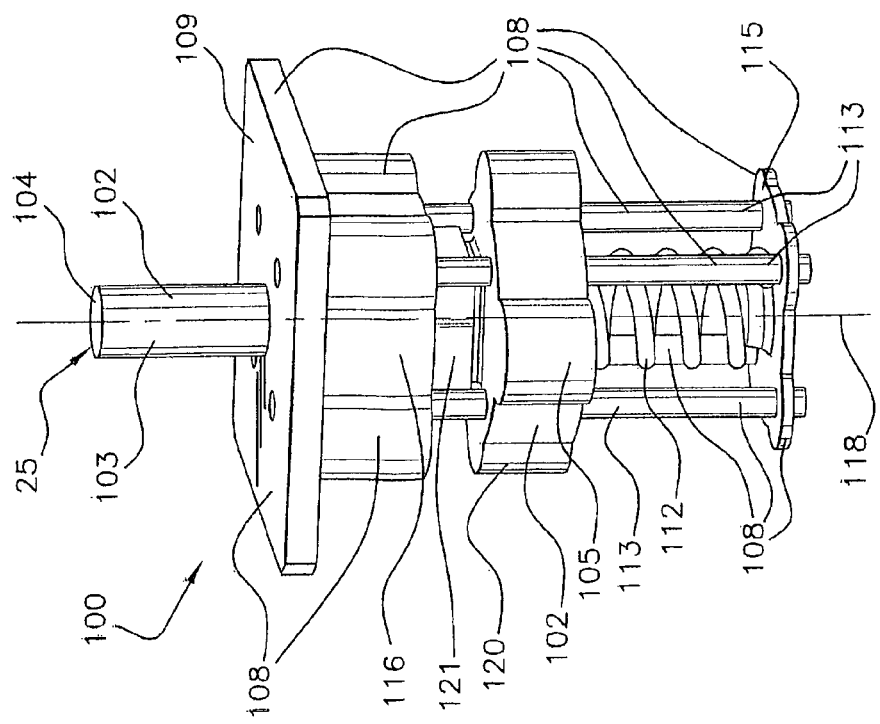

UNITARY PANEL FOR THE FLOOR OF A VEHICLE, FLOOR, AND VEHICLE INCLUDING SUCH A UNITARY PANEL

CROSS REFERENCE TO RELATED APPLICATION

This application is a national stage entry of PCT/EP2013/000941 filed Mar. 28, 2013, under the International Convention claiming priority over French Patent Application No. 12/00968 filed Mar. 30, 2012.

TECHNICAL FIELD

The invention relates to a unitary floor panel for a transportation device—especially an aircraft to a floor, for a means of transportation, comprising such a unitary panel, to a transportation device—especially an aircraft—comprising such a unitary panel, and to a method of producing a floor for a transportation device in which such a unitary panel is used.

A transportation device comprises at least one cabin in which, for example, a number of rows of passenger seats are aligned. The passenger seats are fastened to the floor of the cabin of the transportation device via a plurality of rails. In particular, the seats are fastened to rails that most often extend parallel to the longitudinal axis of the means of transportation.

In particular, in an aircraft, the rails rest on crossbeams that are components of the structural framework (primary structure) of the aircraft, and which extend substantially parallel to one another and transversely to the longitudinal axis of the aircraft. Thus, the rails of the floor, which extend parallel to the longitudinal axis of the aircraft, are securely fastened to component elements of the structural framework of the aircraft. In particular, the rails serve for fastening cabin equipment, such as, for example, seats, galleys, furniture and/or fittings, and for fastening stowed freight, palettes or containers.

PRIOR ART

By way of general illustration of the prior art, an aircraft cabin comprising a plurality of rails extending longitudinally in the aircraft cabin is known, these rails being fastened to transverse beams of the structural framework of the aircraft. Each rail forms a longitudinal slide designed to receive at least one element for fastening a seat and furthermore comprises two flat lateral flanges designed to receive floor panels. The floor panels, which comprise a honeycomb structure, are fastened, generally by way of bolts, to the flat lateral flanges of each rail.

An aircraft floor formed from a plurality of panels is also known from FR 2 891 237, each of the panels being fastened to at least one crossbeam of the structural framework of the aircraft by way of bolts that extend through the panel and a top part of the crossbeam. The panels described in FR 2 891 239 comprise a rail, for fitting seats, having a longitudinal axis, this rail being inserted in the thickness of each panel.

The aircraft floor panel such as described in FR 2 891 239 is not sufficiently strong to allow passengers or freight to be safely transported in the aircraft cabin.

Such a solution, which includes at least one longitudinal rail for fastening seats, formed from titanium or from an aluminum alloy, does not enable the weight of the floor of the aircraft to be reduced, especially relative to the weight of an aircraft floor formed by the superposition of transverse beams, longitudinal rails and panels interposed between the longitudinal rails.

SUMMARY OF THE INVENTION

The invention aims to overcome all of the aforementioned drawbacks. In particular, the invention relates to a unitary floor panel for a transportation device, which panel simultaneously has at least the same mechanical rigidity as a prior-art floor panel, and weighs less.

The invention relates to such a unitary floor panel for a transportation device, which panel does not require a plurality of longitudinal rails to be fitted beforehand in the transportation device intended to receive the unitary floor panel(s).

The invention relates to such a unitary floor panel for a transportation device, which panel is simple to fit in the transportation device and does not require said unitary panel to be inserted into the gap separating two adjacent parallel rails, or the dimensions of said unitary panel to be tailored to the dimensions of this gap.

In particular, the invention relates to such a unitary floor panel for a means of transportation, which panel has a standard size that does not need to be tailored to the size of the gap separating two contiguous parallel rails of a floor of a means of transportation.

The invention therefore relates to such a unitary floor panel for a means of transportation, which panel enables greater modularity and a greater range of variation in the layout of the cabin of the transportation device.

The invention also relates to such a unitary floor panel for a transportation device, which panel meets the recommended requirements, especially those of the aircraft industry, in terms of strength, fire resistance, and the reduced smoke emission in case of fire.

The invention relates to such unitary floor panel for a transportation device, this panel being designed to be easy to install in the cabin of said transportation device.

The invention also relates to such a unitary floor panel for a transportation device, this panel being designed to be easy to maintain.

The invention also aims to achieve all these objectives at a lower cost, by providing a unitary floor panel for a transportation device having an optimized cost price.

The invention also more particularly aims to provide such a unitary floor panel for a transportation device, which floor panel meets recommended safety requirements—especially regarding fire resistance and the generation of smoke—and recommended requirements regarding resistance to mechanical stresses, in particular the requirements recommended in the field of the manufacture of the fittings of aircraft.

The invention also relates to such a unitary panel having mechanical properties compatible with use in a transportation device.

In addition, the invention aims to provide such a unitary floor panel for a transportation device, which panel preserves the working routines of personnel, thereby making it easier to fit and remove the floor of a transportation device, and the implementation of which involves only a small number of actions.

For this purpose, the invention relates to a unitary floor panel for a transportation device, comprising a plate, called a self-supporting plate, having a smallest dimension, called the thickness, extending along a first direction of the self-supporting plate, and two larger dimensions extending along two main directions that are orthogonal to each other and orthogonal to the first direction; the self-supporting plate having two opposite sides, called main sides, that extend substantially parallel to the two main directions; the panel comprising at least one beam securely fastened to the self-supporting plate and having an axis of elongation parallel to at least one first main side of the self-supporting plate, each beam being designed to increase the flexural strength of the unitary panel along the axis of elongation of the beam and having at least one end having an aperture for housing a dual-function member for securely fastening with a structural framework element of the transportation device.

Throughout the description:

the term "self-supporting" qualifies a plate that has a flexural rigidity that is high enough and chosen for it especially to be able to support its own weight without deforming, in particular when said self-supporting plate bears on two crossbeams that are substantially parallel to each other;

the term "unitary" qualifies a floor panel that is formed by a single part, i.e. that cannot be separated into a plurality of distinct and separate elements without breaking or degrading said unitary panel. In particular, such a unitary panel cannot be disassembled into a plurality of elements that can be separated from one another;

the terms "lower" and "upper" are to be understood with respect to a unitary panel according to the invention such as fitted and playing its role in a means of transportation, the upper main side of said unitary panel being oriented upward, and the lower main side being oriented downward. Thus, a unitary panel according to the invention stored with a view to its subsequent installation in order to form a floor for a means of transportation, or following its removal from a floor of a means of transportation, has a lower main side from which emerges or extends at least one beam, and an upper main side that does not have such a beam and that is designed to allow users of the transportation device to move about; and the expressions "structural framework" or "primary structure" of a transportation device—especially a water-based transportation device (for example a ferry, cruise liner or a cargo ship), a rail-based means of transportation, a road-based means of transportation—or an aircraft, denote the structures of the transportation device that provide it with its rigidity, its strength and its shape.

The invention therefore consists in providing a unitary floor panel for a transportation device, which panel is designed to allow the weight of the floor to be reduced while preserving its strength properties, which properties are especially tailored to allow such a unitary panel to be used to form a floor for a transportation device.

Advantageously, the self-supporting plate is made of a material, called the core material, chosen to have a compressive strength that is sufficiently high to allow furniture to be installed bearing on at least one unitary floor panel for a transportation device—in particular without exhibiting substantial compressive strain.

Advantageously, combining the self-supporting plate and the beam(s) allows a unitary panel to be formed having simultaneously a high shock resistance and a high modulus of flexural elasticity, making it suitable for use as a floor for a transportation device.

Furthermore, although such a unitary panel is stronger (more resistant to shocks, greater flexural elasticity) it is nevertheless less bulky—particularly in terms of thickness—and in any case meets the space requirements of aircraft cabins. In particular, such a unitary panel allows a thin self-supporting plate to be used.

In particular, such a unitary floor panel is designed to make it possible not to use the seat guidance rails of the prior art.

In particular, such a unitary floor panel is designed to be able to be fitted on at least one structural framework element of an aircraft, rails for the fastening of seats and/or furniture not being required.

Advantageously, a plurality of unitary panels according to the invention can be used to produce a flat floor for a transportation device even when unitary panels comprising self-supporting plates of different thicknesses and different strengths are used. The unitary panel according to the invention is a modular flooring element for a transportation device in that it allows the mechanical properties of said unitary panel to be altered without changing the thickness of the unitary panel. Such a unitary panel makes modular layout of the internal volume of the transportation device possible.

Advantageously, a unitary floor panel for a transportation device comprises a self-supporting plate having a length and a width forming its two largest dimensions.

Advantageously, and according to the invention, the self-supporting plate comprises a skin, called the cabin skin, extending over its surface and securely fastened to a first main side, called the upper side, of the self-supporting plate—especially designed to allow a user to move across the floor of said transportation device—and means for joining—especially via adhesive bonding—the cabin skin and the self-supporting plate.

Advantageously, and according to the invention, the self-supporting plate comprises a skin, called the lower skin, extending over its surface and securely fastened to a second main side, called the lower side, of the self-supporting plate and means for joining—especially via adhesive bonding—the lower skin and the self-supporting plate.

Advantageously, in a unitary panel according to the invention, the cabin skin and/or the lower skin is (are) made of a rigid material. In particular, the rigid material forming the cabin skin is designed to allow a user to move across the floor of said means of transportation.

Advantageously, in a unitary panel according to the invention, the cabin skin is made of a material chosen from the group comprising metals (for example aluminum or steel) and composites comprising a filler—especially a unidirectional layer or a fabric—chosen from the group comprising carbon fillers, glass fillers, aramid fillers (aromatic polyamides), fillers made of natural fibers—especially bamboo fibers—and a resin chosen from the group comprising thermoplastic resins, for example polyetherimide (PEI), ultra-dense polyetherimide resins, polypropylene sulfone (PPS) resins, resins such as polyetheretherketone (PEEK), and thermoset resins, for example epoxy resins or phenolic resins. In particular, such a cabin skin provides a good strength and a low weight.

Advantageously, the cabin skin and the lower skin are formed from the same material.

Advantageously, the cabin skin is itself a rigid skin (sheet), and is designed to be able to be subjected to an acceptable elastic strain—especially bending. The cabin skin itself may however have a certain flexibility, especially as regards to elastic bending in the largest dimension of the skin. In this case, joining the cabin skin to the self-supporting plate adds its rigidity to the unitary floor panel.

Advantageously, the self-supporting plate comprises at least one core material chosen from the group comprising a honeycomb core, a foam core, a lattice core, a woven core and a nonwoven core.

Advantageously, the self-supporting plate is a core made of a transparent thermoplastic material, especially polymethyl methacrylate (PMMA), known by the trade name Plexiglas®.

Advantageously, the self-supporting plate may be formed from a honeycomb core. Advantageously, the honeycomb core may be formed from any appropriate rigid material, especially from a material chosen from the group comprising aluminum, aluminum alloys, poly (p-phenylene terephthalamide) (known especially by its trade name Kevlar®), a thermoplastic—especially, optionally partially, cross-linked polypropylene—PVC, and polycarbonate. Advantageously, the material of the honeycomb core may be a material that has undergone a surface treatment in order to make it impermeable to gases and/or liquids.

Advantageously, the honeycomb core may be formed by assembling different materials. Advantageously, the honeycomb core may consist of a peripheral rigid structure, also called a skeleton, and cells (or hollow bodies, cavities or pores). In this particular embodiment, the open cells form a spacer preventing the deformation of the cabin skin under the weight of passengers or furniture.

Advantageously, the honeycomb core is made of a material containing cavities or pores that pass right through the honeycomb core and emerge onto both main sides of the honeycomb core.

Advantageously, the self-supporting plate may be made of a solid foam chosen from the group comprising foams with open pores and foams with closed pores. Advantageously, the solid foam will be chosen from the group comprising polyurethane foams, aluminum foams, carbon foams, thermoset foams, thermoplastic foams and balsa foams.

Advantageously, the self-supporting plate is chosen from the group comprising rigid honeycomb cores, rigid cores made of rigid foams, and rigid cores formed from a plurality of elements made of rigid foam.

Advantageously, the self-supporting plate may be formed from a plurality of elements made of rigid foam, said elements made of rigid foam being bonded to one another so as to form the self-supporting plate of the unitary floor panel.

Advantageously, given that each of the elements made of rigid foam has an elongated shape and a trapezium-shaped cross section, said elements made of rigid foam are associated with one another in order to form the self-supporting plate.

Advantageously, the beam is formed from a solid material chosen from the group consisting of metals, thermosets and thermoplastics. In particular, the beam is formed from a solid thermoset comprising a fire resistant epoxy resin that does not generate smoke when it burns.

Advantageously, the self-supporting plate and the beam are associated with each other by any means known per se by those skilled in the art, especially by welding or by adhesive bonding of the self-supporting plate and the beam. It is also possible for the self-supporting plate and the beam to be associated with each other via adhesive bonding of a skin, called the lower skin, that extends over the lower surface of the self-supporting plate—especially of the honeycomb core—and the beam.

Advantageously, the unitary panel comprises, at least partially filling at least one cell of the honeycomb core, an amount of a reinforcing material chosen from the group comprising thermoset resins—especially epoxy resins, phenolic resins and foams. In particular, such a unitary panel comprises such a reinforcing material filling the cells of the honeycomb core lying facing at least one beam segment of said unitary panel, said amount of thermoset being designed to reinforce the strength of the unitary floor panel.

Advantageously, and according to the invention, each beam protrudes from and makes contact with only one of the two main sides of the self-supporting plate—especially the honeycomb core.

In a unitary panel according to the invention, the one or more beams protrude from the surface and make contact with one of the two main sides of the self-supporting plate—especially the honeycomb core. However, it is also possible for the one or more beams to be at least partially inserted into the thickness of the self-supporting plate—especially the honeycomb core—of the unitary panel.

Advantageously, the one or more beams are completely inserted into the thickness of the self-supporting plate—especially the honeycomb core—of the unitary panel.

Advantageously and according to the invention, each beam makes contact with a first main side, called a lower side, opposite an upper side of the self-supporting plate—especially the honeycomb core.

In a unitary panel according to the invention, the beams lie on that side of the self-supporting plate which is opposite the upper side of the self-supporting plate, said upper side of the self-supporting plate—especially the honeycomb core—being flat and designed to allow a user to move across the floor of said means of transportation. In a unitary panel according to the invention, the beams do not hinder the movement of passengers, but increase the flexural strength of the unitary panel.

Advantageously, and according to the invention, each beam has at least one hollow segment with a polygon-shaped cross section. Advantageously, at least one of the beams has at least one hollow segment with a polygon-shaped cross section. Advantageously, each beam has at least one hollow segment with a trapezium-shaped cross section. Advantageously, the cross section of each hollow segment of the one or more beams is a trapezium-shaped cross section. An "omega-shaped" stiffening element is then spoken of.

Advantageously, the one or more beams may have a cross section of a complicated shape. In particular, the one or more beams may have cross sections with flat lateral extensions. In this configuration, the area of that surface of each beam which makes contact with the self-supporting plate is increased.

Advantageously, and according to the invention, the beam has at least one hollow segment with a polygon-shaped cross section, said hollow segment lying at least one of the longitudinal ends of said beam.

Advantageously, and according to the invention, the beam takes the form of a profile. Advantageously, the beam has a cross section, the shape—especially a polygon, in particular a trapezium—and size of which are identical over its entire length. Advantageously, each hollow segment of the beam lies at each end of the beam and on the periphery of the self-supporting plate.

Advantageously, the beam takes the form, over its entire length, of a cylinder having a trapezium-shaped cross section.

Advantageously, the beam is a hollow beam containing an internal space that emerges onto the two longitudinal ends of the hollow beam.

Advantageously, the beam is formed by one element of the plurality of elements made of rigid foam, said elements being constituents of the self-supporting plate.

Advantageously, and according to the invention, each hollow segment has a trapezium-shaped cross section and has a substantially flat wall, called the adherent wall, extending facing and making contact with the self-supporting plate, and a wall, called the free wall, opposite the substantially flat adherent wall and parallel to the adherent wall.

Advantageously, and as a first variant according to the invention, each hollow segment lying on the periphery of the self-supporting plate has a trapezium-shaped cross section and has a substantially flat wall, called the adherent wall, extending facing and making contact with the self-supporting—especially honeycomb—plate, and a wall, called the free wall, opposite the substantially flat adherent wall and parallel to the adherent wall.

In this first variant according to the invention, each beam of the unitary panel comprises, at each of its ends, a hollow segment having two substantially parallel opposed walls containing a cavity for mating two adjacent unitary panels and for securely fastening the unitary panels to a structural framework element of the transportation device.

Advantageously, and according to the invention, each hollow segment forms a housing designed to be able to receive and interact with a dual-function member for securely fastening at least one floor panel with an element—especially a crossbeam—of the structural framework of the transportation device. Such a dual-function fastening member extends over a single beam in contrast to the rails for fastening seats of the prior art, which extend over a plurality of adjacent beams. Fitting of a unitary panel according to the invention by means of such a dual-function fastening member is therefore simplified.

Advantageously, it is possible, in a floor, for a transportation device, formed from unitary panels according to the invention, for certain of these dual-function fastening members to be designed to allow a single unitary panel to be securely fastened to the structural framework of the transportation device, especially for the secure fastening of unitary panels lying on the periphery of the floor of the means of transportation.

Advantageously, the beam comprises a free side having a cross section with the shape chosen from the group comprising concave shapes, convex shapes, and planar shapes.

Advantageously, and according to the invention, each hollow segment forms a housing designed to be able to receive and interact with a dual-function member for securely fastening two adjacent unitary panels to each other and for securely fastening two adjacent unitary panels to an element—especially a crossbeam of an aircraft or a boat—of the structural framework the transportation device.

Advantageously, in one particular embodiment of a unitary panel according to the invention, each hollow segment with a trapezium-shaped cross section has a free wall that is at least partially aperture. In this particular embodiment, advantageously and according to the invention, each housing arranged in the hollow segment and having an opposed wall that is at least partially aperture is designed to receive at least one portion of a dual-function member for securely fastening two adjacent unitary panels to each other and for securely fastening the two adjacent unitary panels to an element of the structural framework of the transportation device—especially to a crossbeam of an aircraft.

Advantageously, a unitary panel according to the invention comprises at least one hollow segment of trapezium-shaped cross section having an at least partially aperture free wall, said hollow segment being designed to receive a dual-function member for securely fastening a unitary panel to the element of the structural framework of the means of transportation.

It will be noted that installation of a unitary panel according to the invention on the transverse elements of the structural framework of the transportation device is easy and only requires the dual-function member to be matched to the housing housed in the hollow segment, and the unitary panel to be fastened to the dual-function member, the dual-function member optionally being securely fastened to the element of the structural framework of the means of transportation.

Advantageously, and according to the invention, each beam is hollow and contains an internal space bounded by the adherent wall and by the free wall.

Advantageously, and according to the invention, the unitary panel contains a plurality of mortises passing through the self-supporting plate and the adherent wall of the beam and emerging, on the one hand, onto the upper side of the self-supporting plate, and on the other hand, onto a space inside the beam.

Advantageously, the beam is a hollow beam containing an internal space bounded by the adherent side and by the free side and communicating with the plurality of mortises in the unitary plate.

Advantageously, and according to the invention, each mortise is designed to be able to receive and interact with a peg for fastening a fastening member—especially a fastening member forming a clevis fastener—for an item of furniture of the transportation device—especially an aircraft seat—said fastening member being designed to be able to interact with the furniture of the transportation device and to immobilize said item of furniture on the floor of the means of transportation.

In one particular embodiment of a unitary panel according to the invention, each mortise in the unitary plate is shaped in order to be able to receive a fastening peg, said fastening peg comprising a locking member shaped so that:

in a first position of the fastening peg and of the locking member, said fastening peg can be freely introduced into the mortise; and so that in a second position of the fastening peg and of the locking member, distinct from the first position, the locking member is kept in the mortise and the member for fastening furniture of the transportation device is securely held by the unitary plate.

Advantageously, and according to the invention, the mortises of the plurality of mortises are regularly distributed in the main plane of the self-supporting plate of the unitary panel in at least one group of mortises, the mortises of each of the groups of mortises being aligned facing each beam. Each of the mortises may have a cross section of a particular shape, especially a polygonal shape, an ovoid shape, or any other shape except a circular shape. In particular, each of the mortises may have a cross section with a four-lobed shape, for example a shape based on a circle and having four protrusions having, pairwise, an axis of symmetry perpendicular to the two main sides of the self-supporting plate.

Moreover, advantageously and according to the invention, the unitary panel comprises at least one secondary stiffening element extending between two consecutive beams of the unitary panel, perpendicularly to said beams, and making contact with the lower side of the self-supporting—especially honeycomb—plate. Advantageously, the unitary panel according to the invention comprises such secondary stiffening elements designed to increase the strength of the unitary panel—especially when the unitary panel is used to support furniture.

Advantageously, and according to the invention, the fastening member is shaped so as to form a secure connection with an item of furniture—especially a chair—of the means of transportation, and so as to be able to receive a screw-shaped end of the fastening peg, and so as to enable the fastening member to be securely fastened to the unitary panel by means of a nut.

Advantageously, and as a variant according to the invention, each mortise in the unitary panel is designed to receive a device for fastening a fitting to the upper side of the unitary panel, the fastening device being noteworthy in that it comprises:

a clamping member comprising a jaw, called the clamping jaw, shaped to pass through the mortise and to bear on an internal side of the adherent wall extending facing the space inside the beam of the unitary panel and comprising means for attaching the fittings to the upper side of the unitary panel; and a pin for anchoring the fastening device to the unitary panel, which anchoring pin rotates as one with the clamping member and comprises a jaw, called the anchoring jaw, designed to bear on the upper side of the unitary panel, said clamping member being designed to move in translation relative to the anchoring pin between:

a position, called the clamped position of the fastening device, in which the clamping jaw and the anchoring jaw are returned toward each other by elastic return means and in which the clamping jaw makes contact with the internal side of the adherent wall and the anchoring jaw makes contact with the upper side of the unitary panel; and a position, called the installation position of the fastening device, in which the clamping jaw and the anchoring jaw are further apart from each other relative to the clamped position.

Advantageously, in the installation position, there is a gap between the clamping jaw and the anchoring jaw of the fastening device, said gap being designed to allow the fastening device to be rotated relative to the unitary panel.

Moreover, advantageously, and according to the invention, the dual-function member comprises:

a base designed to be able to rest on and be securely fastened to an element of the structural framework of the transportation device; and a portion protruding from the base, said portion being designed to interact with the hollow segment of polygon-shaped cross section at the longitudinal end of said beam so as to substantially immobilize said unitary panel when the protruding portion of the dual-function member interacts with said hollow segment.

Also, advantageously and according to the invention, the unitary panel has at least one of the following features:

the unitary panel has a total thickness between 7 mm and 40 mm;

the largest dimension of the unitary panel, called its length, is between 1000 mm and 3000 mm, and its width is between 500 mm and 1500 mm; and the weight of the unitary panel per unit area is between 4 kg/m$^2$ and 20 kg/m$^2$.

The invention moreover relates to a floor for a transportation device—especially an aircraft—comprising at least one unitary panel according to the invention.

The invention also relates to a method for producing a floor for a transportation device, in which at least one unitary panel according to the invention is used, and to a transportation device equipped with such a unitary panel. In such a method, a unitary panel according to the invention is chosen and the floor of the transportation device is formed by juxtaposing unitary panels on at least one element of the structural framework of the means of transportation.

The invention also relates to the use of a unitary panel according to the invention to produce a floor for a transportation device.

The invention also relates to the use of a unitary panel according to the invention in a transportation device—especially an aircraft. The invention also relates to an aircraft equipped with a unitary panel according to the invention.

The invention also relates to a unitary panel, to a method for producing a floor for a transportation device comprising such a unitary panel, to a floor comprising such a unitary panel, to the use of such a unitary panel, and to a transportation device comprising such a unitary panel, characterized in combination by all or some of the features mentioned above or below.

BRIEF DESCRIPTION OF THE FIGURES

Other aims, features and advantages of the invention will become apparent on reading the following description, which refers to the appended figures showing preferred embodiments of the invention given merely by way of a non-limiting example, and in which:

FIG. 2 is a perspective bottom view with an exploded view of a detail of a unitary panel according to the invention;

FIG. 3 is a perspective top view of a detail of a unitary panel according to the invention;

FIG. 5 is a view of a device for fastening a fitting in a clamping configuration;

FIG. 6 is a view of a device for fastening a fitting in an installation configuration;

DETAILED DESCRIPTION OF THE INVENTION

Figure 1:
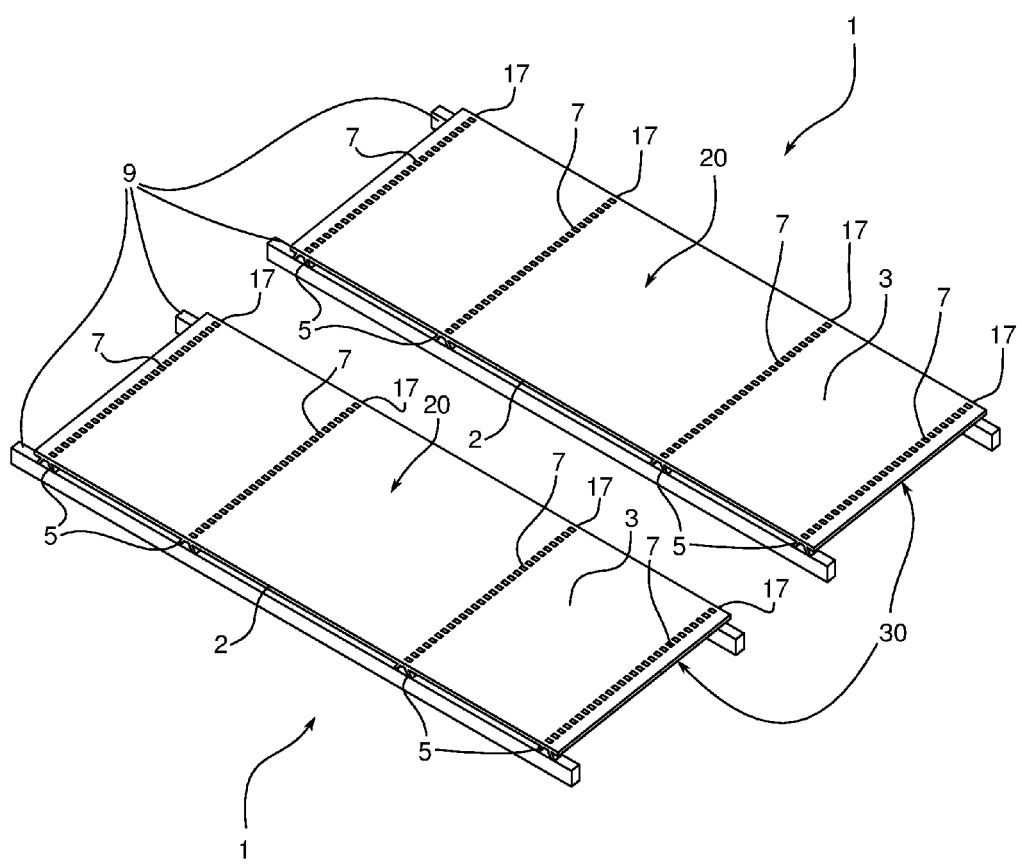
FIG. 1 is a general perspective view of a unitary panel according to the invention.

A unitary panel 1 according to the invention is shown in FIG. 1 positioned on two substantially parallel crossbeams 9 of the structural framework of a transportation device, and resting on said crossbeams. Such a unitary panel 1 comprises a self-supporting plate 2 having a lower side 30 lying facing the crossbeams 9 of the structural framework, and an upper side 20, opposite the lower side, designed to allow users of the transportation device to move about. The self-supporting plate 2 is formed from a honeycomb core 2 coated on its upper side 20 with a skin, called the cabin skin 3. In a first embodiment (not shown) of the invention, is possible for the honeycomb core to also have on its upper side an additional covering for the sake of the comfort, such as a carpet or any other covering for improving the comfort—for example the acoustic comfort—of passengers on board the transportation device.

A unitary panel 1 according to the invention may also have, on its lower side 30, a skin, called the lower skin 4, designed to improve the flexural strength of the unitary panel 1 in one of its main directions of elongation. However, it is possible for a unitary panel 1 not to have such a lower skin 4 and for the beams 5 to make contact with and be securely fastened to the lower side 30 of the honeycomb core 2 directly.

Such beams 5 are manufactured securely fastened to the self-supporting plate 2. It is possible for the beams 5 to be securely fastened to the honeycomb core 2 or, if required, to the lower skin 4 of said honeycomb core 2. In any case, the beams 5 are produced in such a way as to be in dissociable from the self-supporting plate 2 without deterioration of the unitary panel 1.

Fitting of a unitary panel 1 in a transportation device in no way requires rails designed to hold said unitary panel 1, and to guide seats and/or furniture equipping the cabin of the transportation device, to be put in place beforehand.

A unitary panel 1 according to the invention furthermore contains mortises 7 passing transversely through said unitary panel 1 and designed to interact with a member 8 for fastening a seat and/or an item of furniture and to securely fasten this fastening member 8 to the upper side 20 of the unitary panel 1. Advantageously, the mortises 7 are distributed in the plane of the unitary panel 1 so as to form lines 17 of mortises 7 designed for the secure fastening of at least one row of seats in the transportation device. Each line 17 of mortises 7 extends facing a beam 5. In this configuration, the stresses exerted on the seats and on the furniture are transferred directly to the beams 5.

Thus, a unitary panel 1 according to the invention has an upper side 20 that is perfectly flat and designed to allow users and/or passengers to move about in the transportation device.

Such a unitary panel 1 according to the invention allows a transportation device to be equipped with a plurality of unitary panels 1 according to the invention, each panel 1 of the plurality of unitary panels 1 having identical dimensions.

A detail of a unitary panel 1 according to the invention seen from below with a cutaway is shown in FIG. 2. The unitary panel 1 comprises a self-supporting plate 2 formed from a honeycomb core 2, a superficial cabin skin 3 making contact with and securely fastened to the upper side 20 of the honeycomb core 2, and a superficial lower skin 4 making contact with and securely fastened to the lower side 30 of the honeycomb core 2. The honeycomb core 2 is of a type known per se by those skilled in the art, i.e. having various thicknesses depending on the desired applications, various pore or cell 19 shapes—especially hexagonal in section—and made of various materials.

Such a unitary panel 1 comprises a beam 5 that is securely fastened to the self-supporting plate 2 and that makes contact with the lower skin 4. The beam 5 has a hollow segment 6 at its longitudinal end. Advantageously, the beam 5 is hollow over its entire length. The hollow segment 6 of the beam 5 has a wall 12 adherent to the lower skin 4 of the self-supporting plate 2 and a side opposite said first side lying facing a space 14 inside the beam 5. The hollow segment 6 of the beam 5 also has a free wall 13, one side of which lies facing the internal space 14. The adherent wall 12 and the free wall 13 together define the internal space 14 forming a housing 11 designed to receive a dual-function member 10 for securely fastening two adjacent unitary panels 1 to each other and for securely fastening each of these unitary panels 1 to a crossbeam 9 of the transportation device. Such a hollow segment 6 has at least one end containing an aperture, cut out in the free side 13 of the beam 5.

The unitary panel 1 shown in FIG. 2 comprises at least one mortise 7 designed to receive a member 8 for fastening a seat to the upper side 20 of the unitary panel 1. The unitary panel 1 furthermore contains an aperture 21 designed to receive a shim 22 and for embedding said shim 22 in the thickness of the honeycomb core 2 of the unitary panel 1. Such a shim 22 is designed to interact with two adjacent unitary panels 1 and to securely fasten them to a crossbeam 9 of the transportation device.

The unitary panel 1 shown in FIG. 2 furthermore comprises two bores 23 for securely fastening the beam 5 and the unitary panel 1 to the dual-function member 10 by means of screws 24 when the dual-function member 10 is engaged in the housing 11 of the beam 5.

A detail of a unitary panel 1 according to a first variant of the invention, of a dual-function member 10 of two adjacent unitary panels 1, and of a fastening member 8 for fastening a seat or an item of furniture, seen from above and exploded is shown in FIG. 3. In this first variant, the unitary panel 1 comprises a cabin skin 3 extending over and making contact with the upper side 20 of the honeycomb core 2, a lower skin 4 extending under the lower side 30 of the honeycomb core 2 and a beam 5. The unitary panel 1 comprises an aperture 21 designed to receive one of the ends of a shim 22, said shim 22 containing two bores 29 that are complementary to the two bores 23 in the beam 5 of the unitary panel 1. Such a unitary panel 1 furthermore comprises a plurality of mortises 7. The hollow segment 6 lying at the end of the beam 5 of the unitary panel 1 is shaped to provide a housing 11 able to interact with the dual-function member 10 forming a shoe.

Such a dual-function member 10 has a base 39 designed to rest on a crossbeam 9 of the transportation device and to be securely fastened to this crossbeam 9. The dual-function member 10 furthermore comprises a protruding part 40 shaped so as to be able to interact with the housing 11 in the beam 5 and to be able to limit, even prevent, transverse and/or longitudinal movement of the unitary panel 1 relative to the dual-function member 10 and to the crossbeams 9. To achieve this, the protruding part 40 comprises fastening bores 31 designed to receive the screws 24. The dual-function member 10 shown in FIG. 3 is equipped with a tapped counter plate 28 lying in the internal void 32 of the dual-function member 10, said tapped plate 28 forming a plurality of nuts 33, said tapped plate 28 being shaped to provide a nut 33 facing each fastening bore 31 of the dual-function member 10. In particular, the dual-function member 10 has a screw 27 for pre-positioning the tapped counter plate 28 inside the void 32 in the dual-function member 10. Thus, each nut 33 of the tapped counter plate 28 is positioned so as to be able to receive the screw 24 for securely fastening the fastening member 8, the shim 22, the unitary panel 1 and the dual-function member 10 forming the shoe together.

The unitary panel 1, the shim 22 and, if required, the fastening member 8 are securely fastened together, when the unitary panel 1 is in position and forms the floor of a means of transportation, using the dual-function member 10 by means of screws 24 passing through the unitary panel 1, the shim 22 and, if required, the fastening member 8.

Figure 4:
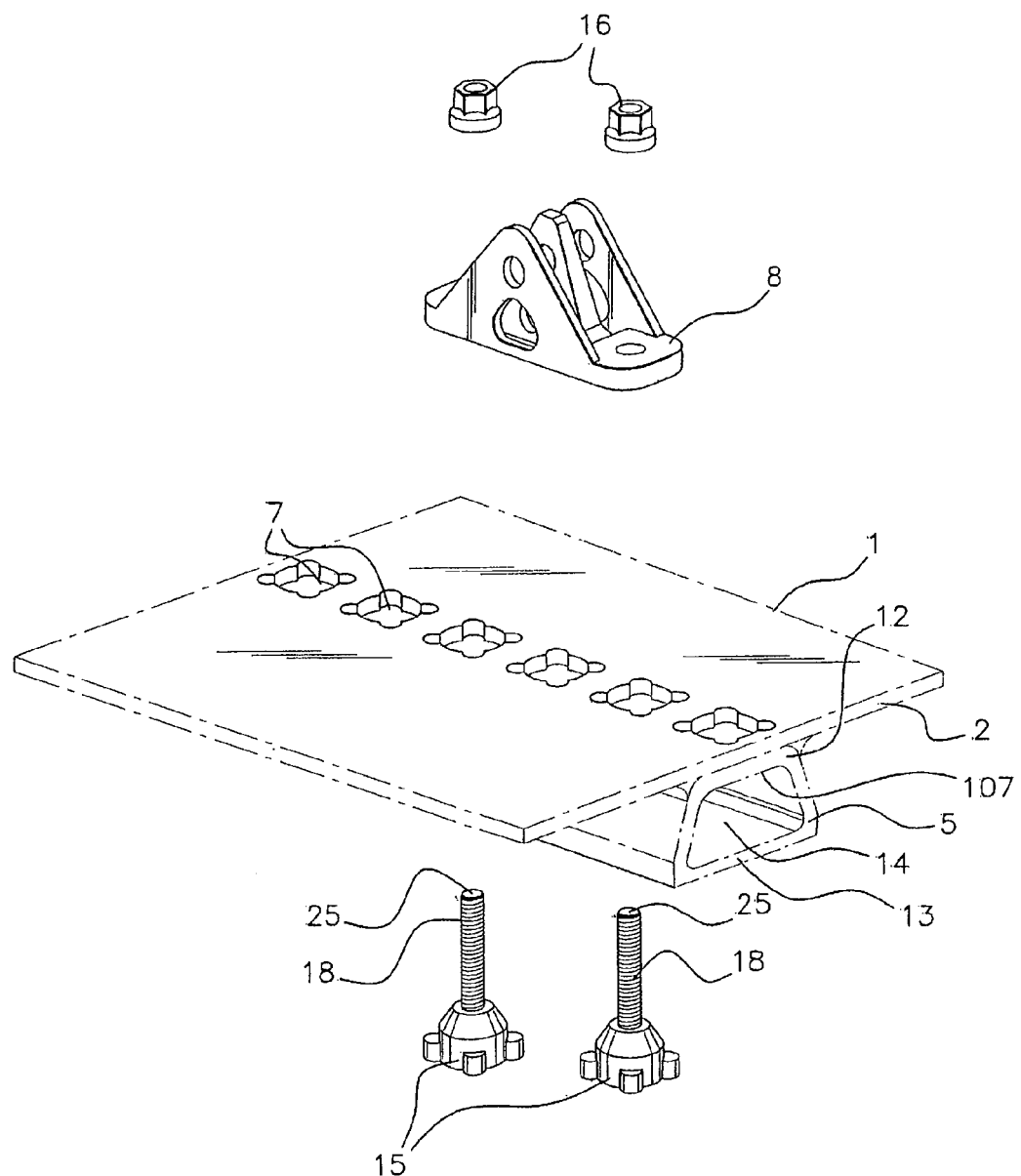
FIG. 4 is a view of a detail of a unitary panel according to the invention in combination with a member for fastening a seat and/or furniture.

A second variant of a unitary panel 1 according to the invention equipped with a fastening member 8 is shown in FIG. 4. In this second variant, the unitary panel 1 comprises a plurality of mortises 7 lying plumb with a beam 5 of the unitary panel 1, said mortises 7 being designed to receive and securely fasten pegs 15 for fastening seats and/or furniture. The mortises 7 and the fastening pegs 15 are each shaped so that, in a first relative position of the mortises 7 and fastening pegs 15, the fastening pegs 15 can be engaged inside the mortises 7 and pass through the self-supporting plate 2 and the adherent wall 12 of the beam 5, and so that, in a second relative position of the mortises 7 and the fastening pegs 15, the latter are held in the mortises 7 and a fastening member 8 can be securely fastened to the unitary panel 1 by means of the fastening pegs 15 and nuts 16 designed to be able to be screwed onto the ends 25 of the fastening pegs 15.

A particular variant of a device 100 for fastening a fitting to a unitary panel 1 is shown in FIG. 5 in the clamped position. Such a fastening device 100 comprises an axis 118 of elongation substantially parallel to an axis perpendicular to the two main sides of the unitary panel 1 receiving said fastening device 100. The fastening device 100 is formed from an anchoring pin 108 comprising an anchoring jaw 109, an anchoring plate 115 and means for guiding a clamping jaw 105, securely fastened to one another, said guiding means being formed by guiding rods 113. If required, the anchoring pin 108 comprises a poka-yoke 116 designed to interact with the walls of a mortise 7 of a unitary panel 1 and to immobilize the anchoring pin 108 and the fastening device 100 in rotation relative to the unitary panel 1.

The anchoring plate 115 of the anchoring jaw 109 has at least one orifice for gripping and extracting the fastening device 100 from the unitary panel 1. In particular, such orifices are shaped in order to be able to receive a tool for gripping the fastening device 100 with a view to its extraction. Thus, a fastening device 100 according to the invention is a fastening device 100 that can be removed and reused.

The poka-yoke 116 that is securely fastened to the anchoring plate 115 contains a void 117 designed to receive and allow the movement in translation of the cylindrical rod 103.

The clamping member 102 of the fastening device 100 is formed by a clamping jaw 105 with a cross section that has a substantially four-lobed shape, and a cylindrical rod 103 extending along the axis 118 of elongation of the fastening device 100 and securely fastened to the clamping jaw 105. The cylindrical rod 103 is designed to allow the clamping member 102 to move in translation relative to the anchoring pin 108. In the variant shown in FIG. 5, the cylindrical rod 103 has a square cross section 121 and the void 117 in the poka-yoke 116 also has a square cross section so as to allow the cylindrical rod 103 to move in translation in the void 117 in the poka-yoke 116. In this variant, the cylindrical rod 103 of the clamping member 102 and the poka-yoke 116 that is securely fastened to the anchoring plate 115 rotate as one.

The cylindrical rod 103 comprises a terminal end designed to receive and securely fasten to a transportation device fastening member 8 of the transportation device. Such a terminal end may comprise fastening means 104 formed by a threaded rod segment designed to be able to receive a nut 16 providing a secure fastening.

The fastening device 100 shown in FIG. 5 comprises elastic means 112 for returning the clamping jaw 105 and the anchoring jaw 109 toward each other. In the clamping position of the fastening device 100 shown in FIG. 5, the clamping jaw 105 and the anchoring jaw 109 exert a transverse force clamping the fastening device 100 onto the unitary panel 1. In this clamping position the poka-yoke 116 is inserted in the mortise 7 in the unitary panel 1, the anchoring jaw 109 being designed to be able to extend over the accessible surface of the unitary panel 1 and the clamping jaw 105 being designed to be able to bear on the internal side 107 of the adherent wall 12 of the beam 5 and extending facing the space 14 inside the beam 5 of the unitary panel 1 via the lobes 120 of the four-lobed clamping jaw 105.

FIG. 6 shows a fastening device 100 in its installation position. The installation position of the fastening device 100 is obtained by applying a compressive force on the clamping member 102 of the fastening device 100. In this installation position, the jaw 105 of the clamping member 102 and the anchoring jaw 109 of the anchoring pin 108 are far apart from each other. In this installation position, the fastening device 100 is shaped so that:

the clamping jaw 105 can be inserted in translation into a mortise 7 in a unitary panel 1 so that said clamping jaw 105 emerges out of the unitary panel 1 and onto the blindside of the latter;

the anchoring jaw 109 and the poka-yoke 116 of the anchoring jaw 109 extend out of the unitary panel 1 and over the accessible side of the latter; and the anchoring pin 108 and the clamping member 102, which rotate as one, can be rotated so as to prevent the clamping jaw 105 and passing through the mortise 7 in the panel 1, said clamping jaw 105 remaining blocked on the blindside of the unitary panel 1 in order to allow the poka-yoke 116 and the mortise 7 in the unitary panel to be aligned, said poka-yoke 116 moving in translation in the mortise 7 and being blocked in rotation in said mortise 7.

Relaxing the compressive stress exerted on the clamping member 102 permits an elastic return, and allows the clamping jaw 105 and the anchoring jaw 109 to move closer to each other, and the fastening device 100 to be clamped onto the unitary panel 1.

Figure 7:
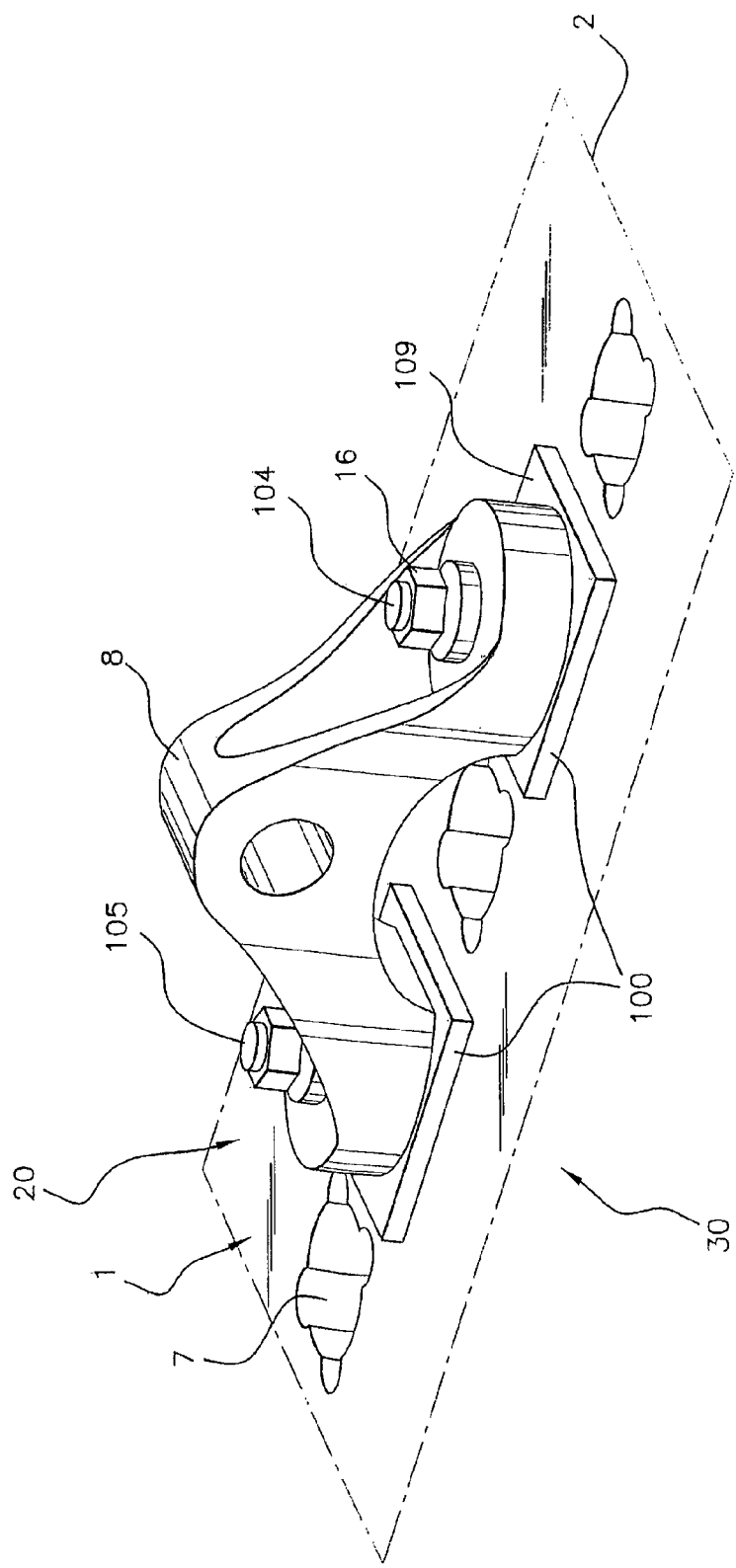
FIG. 7 is a surface view of a unitary panel according to the invention equipped with a device for fastening a fitting.

A member 8 for fastening a fitting—especially an aircraft cabin seat—fitted to a unitary panel 1 according to the invention, is shown in FIG. 7. The unitary panel 1 comprises a self-supporting plate 2 containing mortises 7 that pass through the thickness of said self-supporting plate 2 emerging on both main sides of the latter. The unitary panel 1 is equipped with two devices 100 for fastening a fitting. Each fastening device 100 comprises an anchoring pin 108 extending through the thickness of the unitary panel 1. The anchoring pin 108 comprises an anchoring jaw 109 making contact with the upper side 20 of the unitary panel 1. Each fastening device 100 furthermore comprises a clamping member 102 comprising means 104 for attaching the fitting and for clamping the clamping jaw onto the lower side of the unitary panel 1. The attaching means 104 are designed to interact with a nut 16 for fastening the member 8 to the fastening device 100 and to the upper side 20 of the unitary panel 1.

Figure 8:
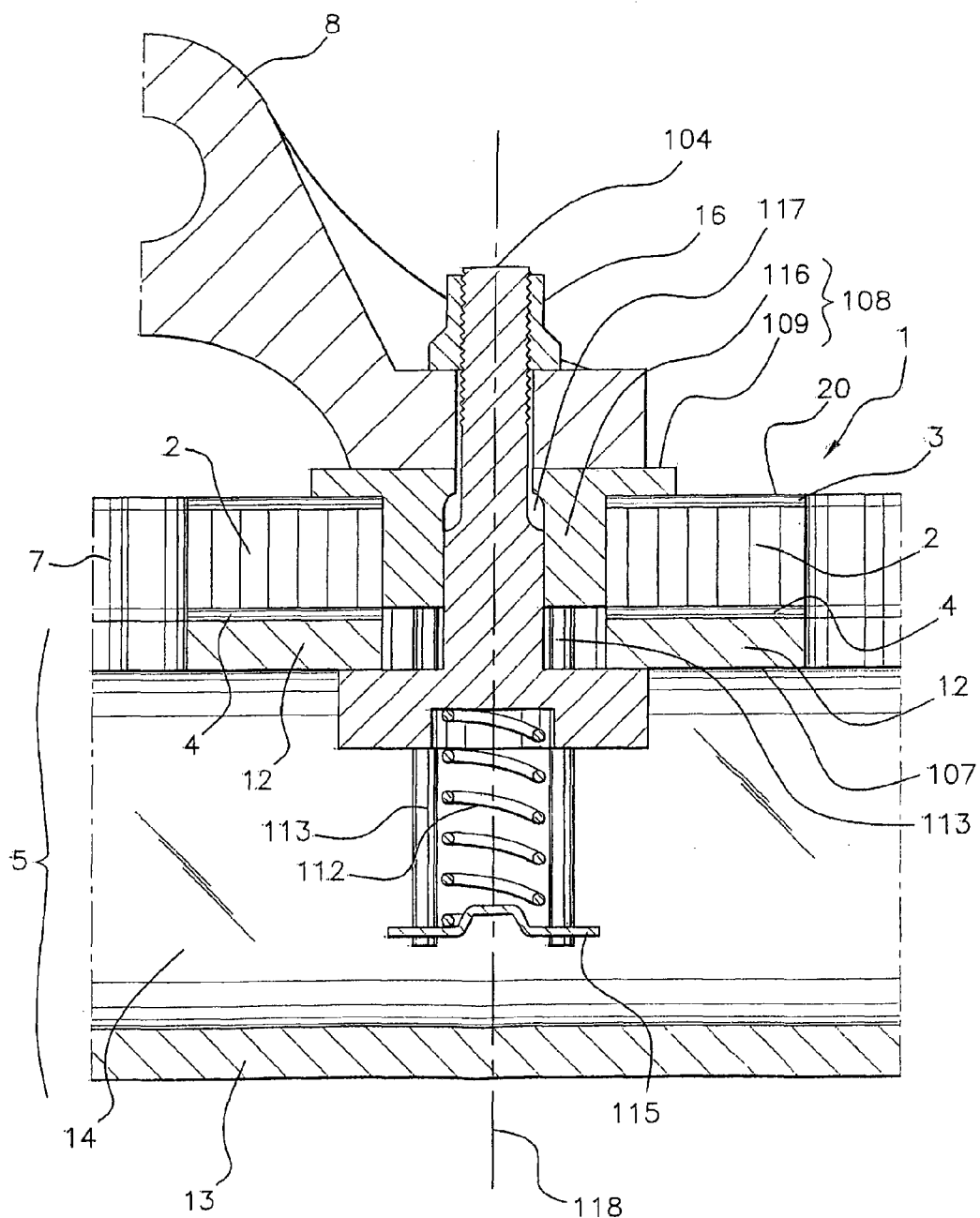
FIG. 8 is a cross-sectional view of a unitary panel in a plane perpendicular to the unitary panel and passing through a beam, comprising a device for fastening a fitting in the clamped position.

A device 100 for fastening a fitting to a unitary panel 1 is shown in FIG. 8 in its clamped position on a unitary panel 1. The fastening device 100 comprises an anchoring pin 108 comprising an anchoring jaw 109, an anchoring plate 115 and rods 113 for guiding a clamping jaw 105, securely fastened to one another. The anchoring pin 108 furthermore comprises a poka-yoke 116 securely fastened to the anchoring jaw 109 and designed to be able to interact with the walls of a mortise 7 in the unitary panel 1 and to immobilize the anchoring pin 108 of the fastening device 100 in rotation relative to the unitary panel 1. The poka-yoke 116 securely fastened to the anchoring plate 115 contains a void 117 designed to receive the cylindrical rod 103 and allow it to move in translation.

The fastening device 100 shown in FIG. 7 comprises elastic means 112 for returning the clamping jaw 105 and the anchoring jaw 109 toward each other. In the clamped position of the fastening device 100 shown in FIG. 7, the clamping jaw 105 and the anchoring jaw 109 exert a transverse force clamping the fastening device 100 to the unitary panel 1. In this clamping position the poka-yoke 116 is inserted in the mortise 7 in the panel 1, the anchoring jaw 109 extends over the accessible surface of the unitary panel 1, and the clamping jaw 105 bears on the internal side of the adherent wall 12 of the beam 5 extending in the internal space 14, via the lobes 120 of the four-lobed clamping jaw 105.

Of course, this description is given merely by way of illustrative example and a person skilled in the art will be able to envision a number of modifications, variants and applications without departing from the scope of the invention, such as, for example, changing the number of beams and/or the dimensions of the unitary panel and/or applying it to other means of transportation.

The invention claimed is:

1. A unitary floor panel (1) for a transportation device comprising:
   a self-supporting plate (2), the self-supporting plate having an upper end and a lower end;
   at least one beam (5) fastened to the lower end of the self-supporting plates (2) and having an aperture located on an end of each beam forming a housing (11);
   a dual-function member (10) that interconnects with the housing (11) of the self-supporting plate (2), the dual-function member (10) including:
   a base (39) adapted to be fastened to a structural framework element (9) of the transportation device;
   a protruding part (40) placed over the base (39) that slides into the housing (11) of the beam (5) securing the self-supporting plate (2);
   wherein each beam (5) has at least one hollow segment (6) with a polygon-shaped cross section;
   wherein each hollow segment (6) has a trapezium-shaped cross section and has a flat adherent wall (12), extending in face of and making contact with the self-supporting plate (2), and a free wall (13), opposite the flat adherent wall (12) and parallel to the adherent wall (12);
   wherein the unitary panel contains a plurality of mortises (7) passing through the self-supporting plate (2);
   wherein each mortise (7) in the unitary panel (1) receives a fastening device (100), the fastening device (100) secures the fastening member (8) to the upper end (20) of the unitary panel (1), said fastening device (100) comprising:
   a clamping member (102) comprising a clamping jaw (105), shaped to pass through the mortise (7) and to bear on an internal side (107) of the adherent wall (12) extending facing the space (14) inside the beam (5) of the unitary panel (1) and comprising an attaching device (104) for fitting the fastening member (8) to the upper side (20) of the unitary panel (1); and
   a pin (108) for anchoring the fastening device (100) to the unitary panel (1),
   which anchoring pin (108) rotates as one with the clamping member (102) and comprises an anchoring jaw (109), adapted to bear on the upper side (20) of the unitary panel (1),
   said clamping member (102) adapted to move in translation relative to the anchoring pin (108) between:
   a clamped position of a fastening device (100), in which the clamping jaw (105) is returned toward the anchoring jaw (109) by elastic return means (112) and in which the clamping jaw (105) makes contact with the internal side (107) of the adherent wall (12) and the anchoring jaw (109) makes contact with the upper side (20) of the unitary panel (1); and
   an installation position of the fastening device (100), in which the clamping jaw (105) and the anchoring jaw (109) are further apart from each other relative to the clamped position.

2. A floor for a transportation device comprising at least two of the unitary panel (1) as claimed in claim 1.

3. The floor according to claim 2, wherein the transportation device is an aircraft.

4. A unitary floor panel (1) for a transportation device comprising:
   a self-supporting plates (2), the self-supporting plate having an upper end and a lower end;
   at least one beam (5) fastened to the lower end of the self-supporting plate (2) and having an aperture located on an end of each beam forming a housing (11);
   a dual-function member (10) that interconnects with the housing (11), the dual-function member including:
   a base (39) adapted to be fastened to a structural framework element (9) of the transportation device;
   a protruding part (40) placed over the base (39) and forming a hollow housing, the protruding part (40) slides into the housing (11) of the beam (5) securing the self-supporting plate (2), the protruding part including a plurality of bores (31);
   a tapered counter plate (28) located inside the hollow housing of the dual-function member, the tapered counter plate (28) includes a plurality of nuts, the nuts (33) are aligned with the bores (31) of the protruding part (40);
   a fastening member (8) including screws (24), the fastening member adapted to secure a furniture;
   wherein each nut (33) of the tapered counter plate (28) is positioned to securely fasten the fastening member (8), the unitary panel (1), and the dual-function member (10) together.

* * * * *